United States Patent [19]
BeVier

[11] Patent Number: 5,657,836
[45] Date of Patent: Aug. 19, 1997

[54] COASTER HUB WITH BRAKE

[76] Inventor: Albert C. BeVier, 3125 42nd Ave. South, Minneapolis, Minn. 55406

[21] Appl. No.: 502,090

[22] Filed: Jul. 12, 1995

[51] Int. Cl.$^6$ .................................. B60T 1/00; B62L 5/00
[52] U.S. Cl. .................... 188/2 F; 188/24.17; 192/6 R
[58] Field of Search .................... 188/2 F, 24.17; 192/6 A, 5, 6 R; 280/304.1, 250.1, 244, 243, 245, 246, 247, 248, 252, 253–258

[56] References Cited

U.S. PATENT DOCUMENTS

| | | | |
|---|---|---|---|
| 994,359 | 6/1911 | Archer . | |
| 2,012,893 | 8/1935 | Schmidt et al. | 192/6 |
| 2,572,182 | 10/1951 | Mueller | 188/26 |
| 4,453,729 | 6/1984 | Lucken et al. | 280/253 |
| 4,560,181 | 12/1985 | Herron | 280/244 |
| 4,652,026 | 3/1987 | Byrge | 280/246 |
| 4,758,013 | 7/1988 | Agrillo | 280/242 |
| 4,762,332 | 8/1988 | Seol | 280/246 |
| 4,811,964 | 3/1989 | Horn et al. | 280/255 |
| 4,840,076 | 6/1989 | Brubaker et al. | 280/246 |
| 4,865,344 | 9/1989 | Romero, Sr. et al. | 280/258 |
| 5,027,930 | 7/1991 | Reed | 192/6 |
| 5,263,729 | 11/1993 | Watwood et al. | 188/2 F |
| 5,362,081 | 11/1994 | Beidler et al. | 192/6 A |

Primary Examiner—Douglas C. Butler
Attorney, Agent, or Firm—Nawrocki, Rooney & Sivertson

[57] ABSTRACT

A coaster brake hub including a housing having a generally cylindrical passage therethrough, an axle, a drive shaft, a drive cone, and a brake mounted within the passage. The passage has a surrounding wall. The hub also includes a clutch disposed within the passage mounted to the axle. The clutch is moveable between a first position and a second position. In the first position, the clutch rotatably interconnects the drive shaft with the brake such that rotation of the drive shaft in a first direction forces the drive cone into engagement with a portion of the passage wall to rotate the housing in the first direction. Rotation of the drive shaft in an opposite direction forces the brake into engagement with another part of the passage wall to brake rotation of the housing. In the second position, the clutch disconnects the drive shaft from the brake such that the rotation of the drive shaft in the first direction forces the drive cone into engagement with the portion of the passage wall to rotate the housing in the first direction. Rotation of the drive shaft in the opposite direction rotates the drive shaft in the opposite, direction relative to the drive cone such that upon subsequent rotation of the drive shaft in the first direction, the drive cone is forced into engagement with a portion of the passage wall to rotate the housing in the first direction.

24 Claims, 4 Drawing Sheets

COASTER HUB WITH BRAKE

BACKGROUND OF THE INVENTION

The present invention pertains generally to the field of coaster brake hubs and, in particular, to coaster brake hubs for wheelchairs.

Coaster brake hubs have, for decades, been used on bicycles. On bicycles, the rear wheel typically includes the coaster brake hub. The typical bicycle coaster brake hub includes a drive shaft connected to the bicycle pedals by way of a chain. When the bicycle is peddled forward, the drive shaft will rotate the hub and rear wheel forward, whereas pedalling the bike in the opposite direction will engage the brake. Generally, the rear wheel will be free to rotate (coast) in a forward direction if the peddles are neither rotated in a forward direction or in the opposite direction. Coaster brake hubs have also been suggested for use on vehicles other than bicycles.

A typical coaster brake hub is disclosed by Agrillo for use with a wheelchair in U.S. Pat. No. 4,758,013. The coaster brake hub disclosed by Argillo has a first mode of operation in which rotation of the drive shaft in a first direction rotates the hub in a first direction and rotation of the drive in the opposite direction brakes the rotation of the hub. This mode of operation is substantially similar to the mode of operation discussed above with regard to typical bicycle coaster brake hubs. Agrillo further discloses, however, a reverse enable lever which can be moved from a configuration in which the hub operates in the first mode to a configuration in which the hub is placed in a second mode of operation. In the second mode of operation, rotation of the drive shaft in the first direction results in rotation of the hub in the first direction and rotation of the drive shaft in the opposite direction results in rotation of the hub in the opposite direction. In the second mode of operation, the hub may be rotated in a first direction and a second direction, however, braking in the second mode is not provided for.

SUMMARY OF THE INVENTION

The present invention pertains to a coaster braze hub which can be used with a wheelchair or other vehicle. The coaster brake hub of the present invention has two modes of operation. In the first mode of operation, rotation of a drive shaft in a first direction results in rotation of the hub in a first direction and rotation of the drive shaft in an opposite direction brakes rotation of the hub. In the second mode of operation, rotation of the drive shaft in a first direction results in rotation of the hub in the first direction, whereas rotation of the drive shaft in the opposite direction resets the hub for further rotation in the first direction.

The second mode of operation is particularly useful when the hub is incorporated into a wheelchair including levers connected to the drive shaft for propelling the wheelchair forward as will be explained in more detail below. Further, the levers may be configured to allow a user to shift from the second to the first mode of operation for braking.

The coaster brake hub of the present invention can include a housing having a generally cylindrical passage therethrough, having a surrounding wall. The coaster brake hub preferably includes an axle, a drive shaft, a drive cone, and a brake mounted within the passage.

A clutch is disposed within the passage mounted to the axle. The clutch is moveable between a first position and a second position to move the hub between a first and a second mode of operation respectively. In the first position, the clutch rotatably interconnects the brake and the drive shaft such that rotation of the drive shaft in a first direction forces the drive cone into engagement with a portion of the passage wall to rotate the housing in a first direction. Rotation of the drive shaft in the opposite direction forces the brake into engagement with another part of the passage wall to brake rotation of the housing.

In the second position, the clutch disconnects the drive shaft from the brake such that the rotation of the drive shaft in the first direction forces the drive cone into engagement with the portion of the passage wall to rotate the housing in the first direction. Rotation of the drive shaft in the opposite direction rotates the drive shaft in the opposite direction relative to the drive cone such that upon subsequent rotation of the drive shaft in the first direction, the drive cone is forced into engagement with the portion of the passage wall to rotate the housing in the first direction.

The coaster brake hub of the present invention can be included in a wheelchair having at least two wheels. Two of the wheels can each include one of the coaster brake hubs. The wheelchair preferably further includes at least two levers, each lever having two ends. One end is preferably connected to the hub drive shaft and the other end is adapted for holding by a person sitting in the chair. The levers are rotatable in the first direction to rotate the drive shaft in the first direction and rotatable in the second direction to rotate the drive shaft in the second direction.

The clutch preferably includes a coupling and an actuator rod. The actuator rod can be longitudinally disposed through the axle. The rod is coupled to the coupling and adapted for slidable movement therewith. The coupling of the clutch can be generally cylindrical. The coupling can include a plurality of cogs for selective engagement with the drive cone and brake. The rod is preferably coupled to the coupling by a bearing member. The coupling can include a circumferential groove engageable with the bearing member such that the coupling can rotate relative to the bearing member and the rod.

Each lever preferably includes an adaptor. The adaptor includes an end connected to the rod. The levers are preferably configured to be pivotable generally transversely to their direction of rotation such that the rod and the coupling can be slidably moved between the first and second position by the adaptor.

DETAILED DESCRIPTION OF THE INVENTION

Figure 1:
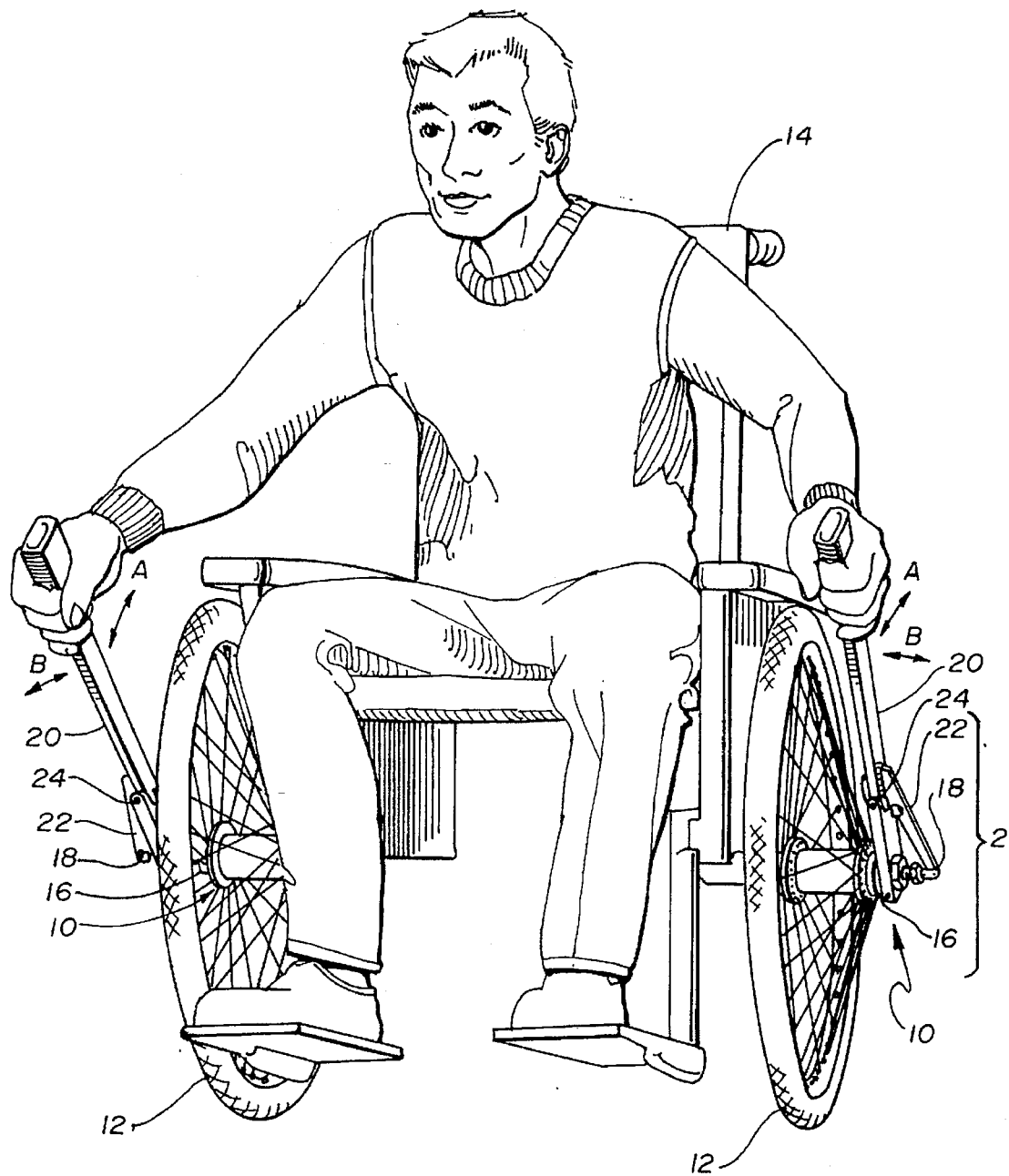
FIG. 1 is a perspective view of a person seated in a wheelchair equipped with the coaster brake hubs and levers of the present invention.

Referring now the drawings wherein like reference numerals refer to like elements throughout the several views, FIG. 1 shows two coaster brake hubs in accordance with the present invention generally referred to by the numeral 10. As shown in FIG. 1, the hubs are incorporated into wheels 12 of a standard wheelchair 14. Hub 10 includes a drive shaft 16 and a clutch actuator rod 18.

Wheelchair 14 is equipped with levers 20. Each lever 20 has two oppositely disposed ends. One end is connected to drive shaft 16 and the other end is configured for grasping by a user. Lever 20 preferably includes adaptor 22 and pivot 24. Adaptor 22 preferably includes two ends, one of which is connected to an end of clutch actuator rod 18. The other end of adaptor 22 is connected to lever 20 on the portion of lever 20 between pivot 24 and the end of lever 20 configured to be grasped by the user. As shown by arrows A in FIG. 1, levers 20 can be rotated in a plane generally parallel to the circumference of wheel 12 to rotate drive shaft 16. The arrows B in FIG. 1 show that the portion of lever 20 between pivot 24 and the end of lever 20 configured to be grasped by the user can be pivoted about pivot 24 generally transversely to the circumference of wheel 12. As will be explained in more detail below, rotation and pivoting of levers 20 as indicated by arrows A and B can propel or brake the rotation of wheels 12.

Figure 2:
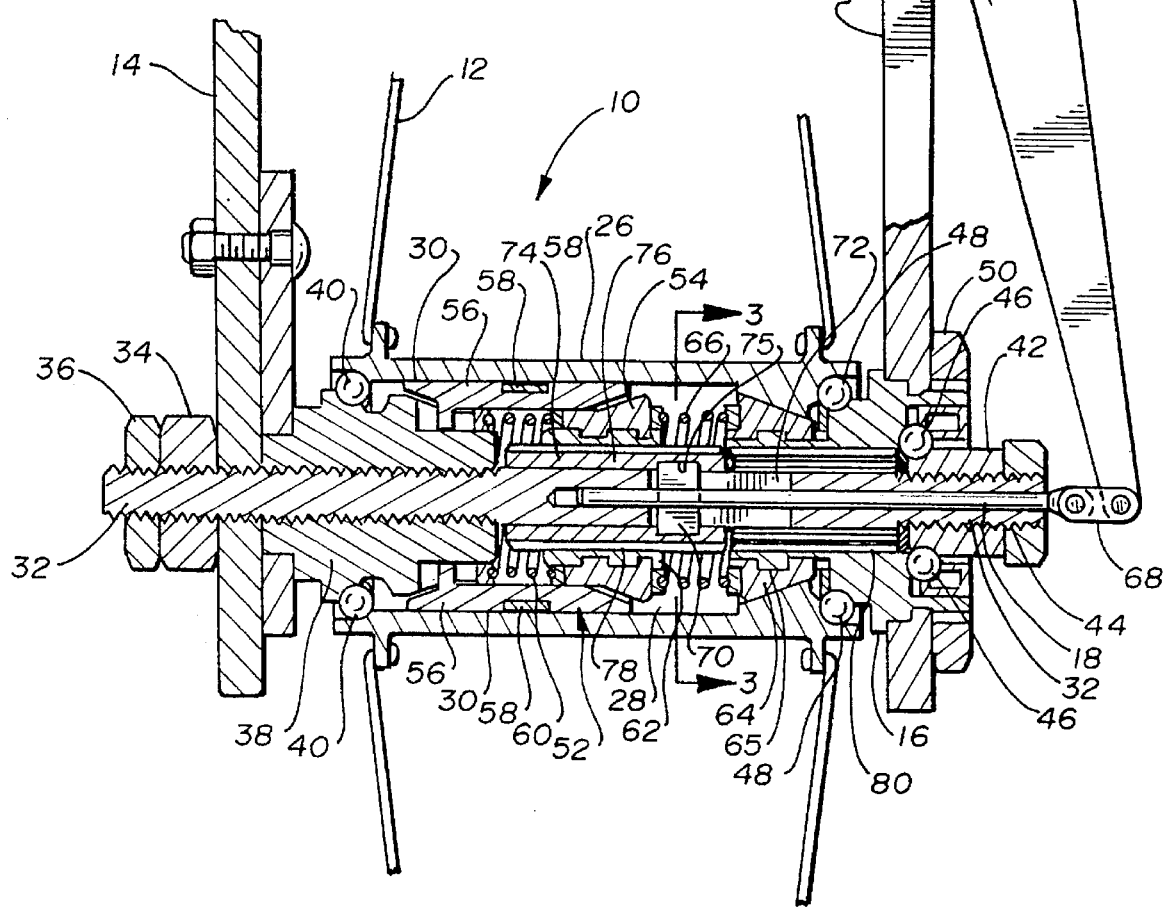
FIG. 2 is a longitudinal cross-sectional view of the coaster brake hub of FIG. 1 showing the clutch in the second position.

FIG. 2 is a longitudinal cross-sectional view of hub 10 taken from FIG. 1. Hub 10 includes a housing 26 having a passage 28 extending therethrough. Passage 28 includes a surrounding wall 30. Hub 10 includes an axle 32 extending axially through passage 28. An end of axle 32 proximate wheelchair 14 is preferably fixably threadably connected to wheelchair 14 by nut 34 and locking nut 36, and outer brake cone 38. Brake cone 38 can also include a bearing race to support bearings 40 which, in turn, support an end of hub housing 26 proximate wheelchair 14.

Hub 10 can be fixably attached to axle 32 by nut 42 and locking nut 44. Nut 42 can include a bearing race supporting bearings 46 which, in turn, can rotatably support drive shaft 16. Drive shaft 16 can, in turn, include a bearing race supporting bearings 48 which, in turn, rotatably support the end of hub housing 26 opposite wheelchair 14. Lever 20 can be fixably attached to drive shaft 16 by locking clip 50.

A brake 52 is disposed within hub passage 28. Brake 52 includes outer brake cone 38 and an inner brake cone 54. Held between outer brake cone 38, inner brake cone 54 and wall 30 of passage 28 is a brake shoe 56. As is well known in the art, brake shoe 56 can be formed from several discrete semi-circular cross-section members held in a generally cylindrical arrangement by retaining member 58 which biases brake shoe 56 toward axle 32. Outer brake cone 38 is preferably fixed against rotation by connection to wheelchair 14. Inner brake cone 54 is preferably held against rotation by spring 60. Inner brake cone 54 is, however, preferably threadably mounted to threaded coupling 62. Brake cone 54 is threadably mounted to enable translational motion of brake shoe 54 relative to the longitudinal axis of axle 32.

A drive cone 64 is preferably threadably mounted on thread 65 to a portion of drive shaft 16 within housing passage 28. Drive cone 64 is preferably held against rotation by spring 66.

Clutch actuator rod 18 is preferably mounted within axle 32 for slidable motion generally parallel to the longitudinal axis of axle 32. Actuator rod 18 has two ends. One end is pivotably connected to adaptor 22 by a pivotable coupling 68. Proximate the opposite end of actuator rod 18 is a bearing member 70 connected to rod 18. Bearing member 70 includes two flanges extending radially from actuator rod 18 through a slot 72 in axle 32. Bearing member 70 engages a clutch coupling 74 rotatably mounted about axle 32 relative to bearing member 70. Within coupling 74, bearing member 70 engages a circumferential groove 75. Clutch coupling 74 as well as being rotatably mounted around axle 32 is also mounted for slidable translation along axle 32 in response to shifting actuator rod 18 parallel to the longitudinal axis of axle 32.

Coupling 74 includes a plurality of circumferentially spaced cogs 76. Cogs 76 are configured for slidable movement through, and engagement with, grooves 78 and 80 in threaded coupling 62 and drive shaft 16, respectively.

Figure 3:
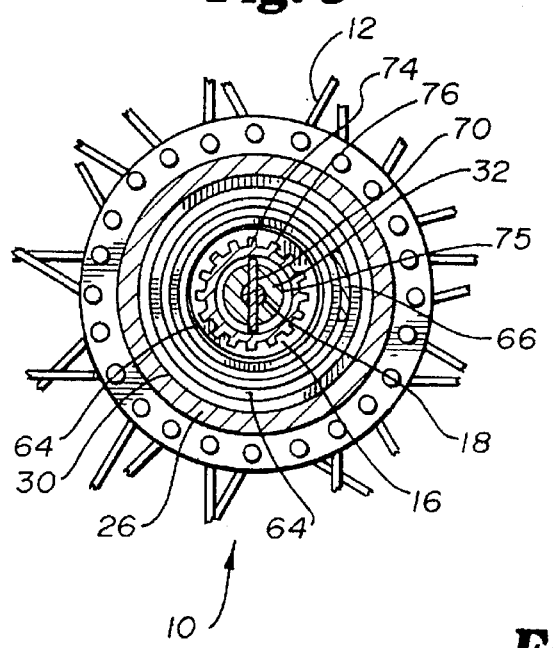
FIG. 3 is a transverse cross-sectional view of the coaster brake hub of FIG. 2.

FIG. 3 shows a cross-section of hub 10 as shown in FIG. 2. In FIG. 3, the radially extending flanges of bearing member 70 of actuator rod 18 are shown extending into groove 75 of clutch coupling 74. The plurality of circumferentially disposed cogs 76 of clutch coupling 74 are also shown.

Figure 4:
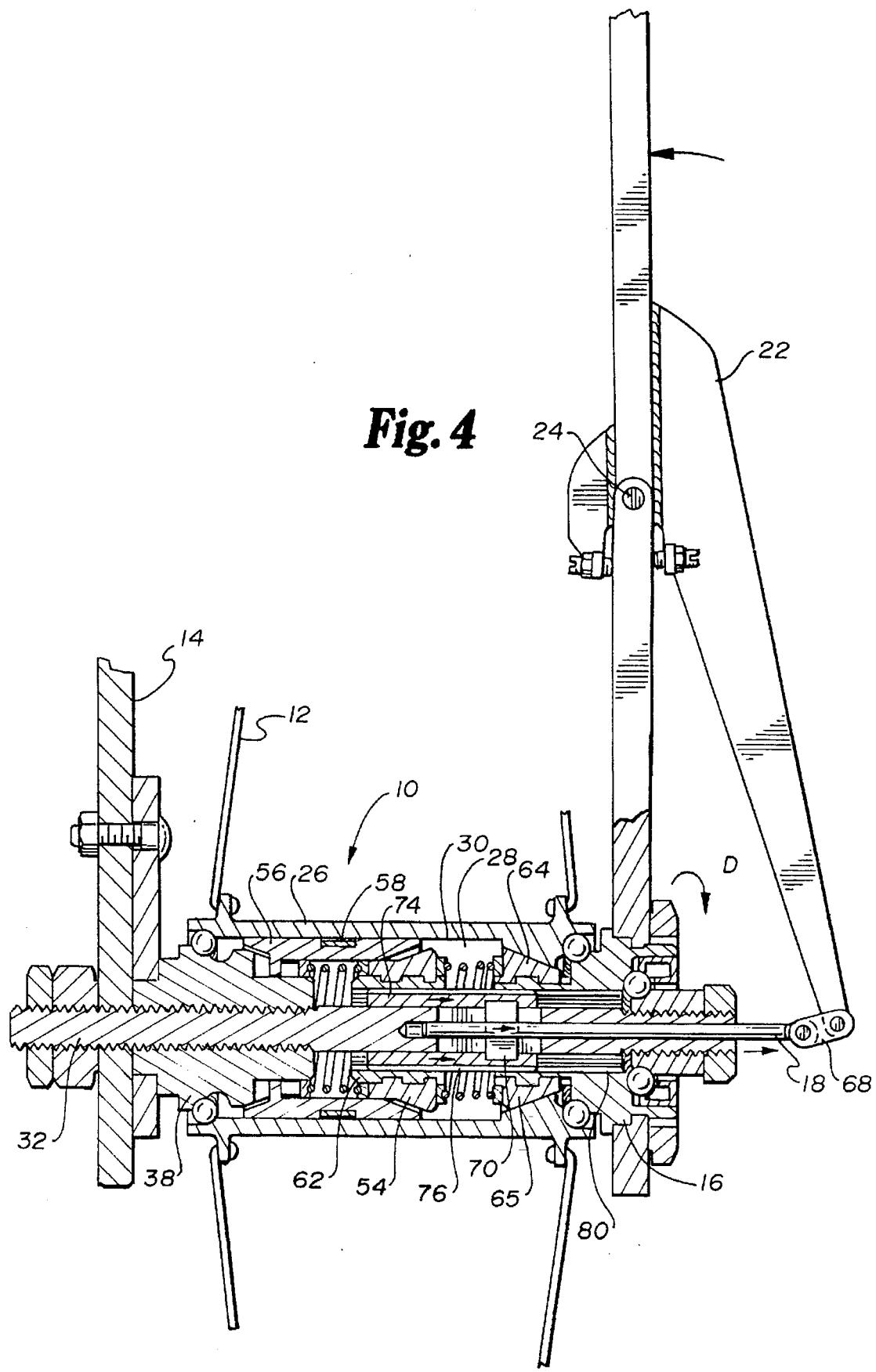
FIG. 4 is a view of the cross-section of FIG. 2, however, the clutch is shown in the first position and the drive shaft rotated in the first direction.

FIG. 4 is a cross-sectional view of the hub shown in FIG. 1. FIG. 4 is the same cross-sectional view as FIG. 2 except that a portion of lever 20 has been pivoted generally transversely to the circumference of wheel 12 in the direction shown by arrow C. Arrow C shown in FIG. 4 is simply half of the double headed arrow B shown in FIG. 1. In this case, arrow C is the portion of arrow B pointing toward the operator seated in chair 14. Pivoting the portion of lever 20 grasped by the operator and including adaptor 22 around pivot 24, shifts actuator rod 18 outward as shown by the arrow adjacent rod 18. This in turn slides clutch coupling 74 longitudinally along axle 32 toward drive cone 64. As clutch coupling 74 is slid toward drive cone 64, cogs 76 engage grooves 80 of drive shaft 16.

As shown in FIG. 4, clutch coupling 74 is in a first position placing hub 10 in a first mode of operation wherein the threaded coupling 62 and brake cone 64 are coupled to drive shaft 16 and drive cone 64 by way of clutch coupling 74. Hub 10 may also be placed in a second mode of operation by shifting clutch coupling 74 into a second position as shown in FIG. 2. Clutch coupling 74 can be shifted into the second position by pivoting the portion of lever 20 connected to adaptor 22 in a direction opposite arrow C.

The first mode of operation is entered for braking rotation of hubs 10 and thus wheel 12. In the first mode of operation, an operator can rotate levers 20 forward as shown by arrow D in FIG. 4 to rotate drive shaft 16 and ultimately wheel 12 forward. Arrow D shown in FIG. 4 is the forward half of the double headed arrow A of FIG. 1 showing the forward rotation of lever 20 in a plane generally parallel to the circumference of wheel 12. As drive shaft 16 is rotated forward, thread 65 rotates to draw drive cone 64 into a portion of wall 30 of passage 28. As drive shaft 16 is rotated a force between drive cone 64 and wall 30 can be generated which is sufficient to frictionally connect cone 64 with hub housing 26 for synchronous rotation therewith about axle 32. Simultaneously, rotation of drive shaft 16 rotates threaded coupling 62 by way clutch coupling 74 to shift inner brake cone 54 away from brake shoe 56. As inner brake cone 54 is drawn away from brake shoe 56, retaining member 58 biases the semi-circular cross-section segments of brake shoe 56 away from wall 30 and toward axle 32.

Figure 5:
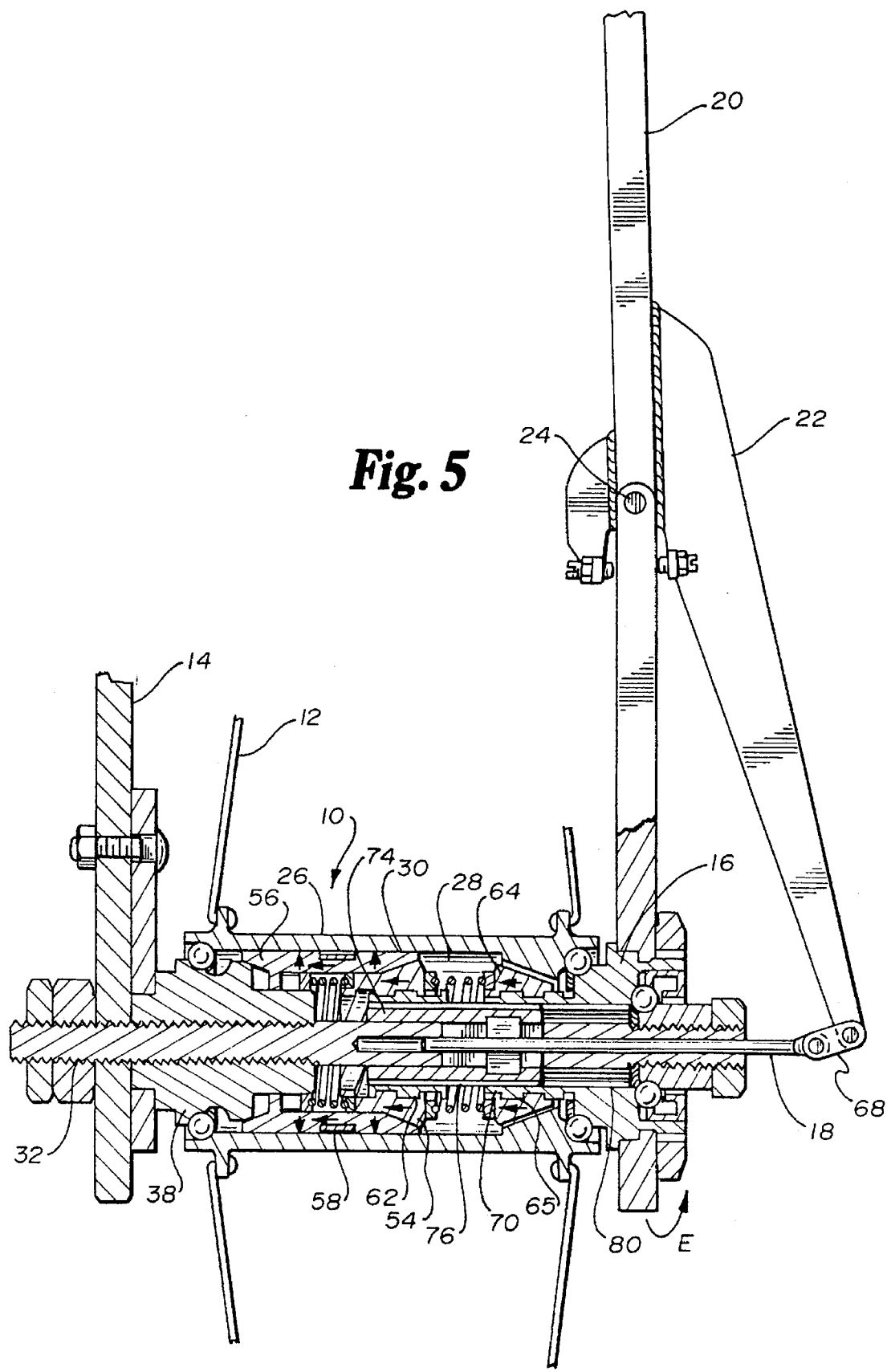
FIG. 5 is a view of the cross-section of FIG. 4 showing the clutch in the first position, however, the drive shaft is shown rotated in a direction opposite the first direction.

FIG. 5 is a cross-sectional view of the hub of FIG. 1. FIG. 5 is the same cross-section as shown in FIG. 4 except that lever 20 has been rotated in a direction opposite arrow D as shown by arrow E. As lever 20 is rotated in the direction of arrow E, threaded coupling 62 is rotated in the same direction as drive shaft 16 by way of clutch coupling 74. As threaded coupling 62 rotates, inner brake cone 54 is urged toward brake shoe 56 as shown by the arrows on inner brake cone 54. As brake cone 54 continues in the same direction, brake shoe 56 is urged toward outer brake cone 38 as shown by the arrows on brake shoe 56 parallel to axle 32. Continued movement of inner brake cone 54 in the same direction causes the expansion of brake shoe 56 into wall 30 of housing 26 to brake rotation of hub 10 and thus wheel 12 as known to those skilled in the art. As drive shaft 16 is rotated in the direction of arrow E, drive cone 64 is moved away from wall 30 of housing 26 as shown by the arrows on drive cone 64.

The second mode of operation is entered for providing forward rotation of hubs 10 and thus wheels 12. In the second mode of operation of hub 10, clutch coupling 74 is disconnected from drive shaft 16 as shown in FIG. 2. When clutch coupling 74 disengaged from drive shaft 16, rotation of levers 20 and drive shaft 16 will not move inner brake cone 54 in either of the directions described above with respect to the first mode of operation. The rotation of drive shaft 16 in the second mode of operation will, however, move drive cone 64 parallel to the longitudinal axis of axle 32.

In the second mode of operation when lever 20 is rotated in direction D, drive cone 65 will be forced into a portion of wall 30 of passage 28 as is the case in the first mode of operation. In the second mode of operation, however, rotation of lever 20 in direction D will not move inner brake cone away from brake shoe 56 because coupling 74 is uncoupled from drive shaft 16. In the second mode of operation when lever 20 is rotated in direction E, drive cone drive 64 will be moved away from wall 30 of passage 28. To efficiently propel wheel 12 and consequently wheelchair 14 forward, drive cone 64 should immediately be moved away from wall 30 of passage 28 as lever 20 is rotated in direction E. Then, when lever 20 is rotated back in direction D, drive cone 64 must engage wall 30 when lever 20 is rotated a substantially shorter distance in direction D than in direction E. In other words drive cone 64 must be disengaged from wall 30 during the back stroke in direction E, but must be engaged for a significant portion of the forward stroke in direction D assuming that the distance traveled by lever 20 in both the back stroke and forward stroke are approximately the same. This can be accomplished by threading drive shaft 16 such that drive cone 64 is unthreaded at the beginning of the back stroke and re-threaded at the beginning of the forward stroke by, for example, providing a short run of threading.

It is also contemplated that rather than including drive cone 64, a ratchet-type mechanism can be used with the hub. Such a ratchet may be similar to those found in free-wheel hubs on bicycles, as well known by those skilled in the art. Such a ratchet would allow free rotation of lever 20 backward in direction E relative to hub 10. When lever 20 is rotated forward in direction D, the ratchet will fix lever 20 for rotation with hub 10 to rotate wheel 12 in a forward direction.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. In a coaster brake hub including a housing having a generally cylindrical passage therethrough, the passage having a surrounding wall; the hub further including an axle, a drive shaft, a drive cone, and a brake mounted within the passage, wherein the improvement comprises:

a clutch disposed within the passage mounted to the axle, the clutch moveable between a first position and a second position, in the first position, the clutch rotatably interconnecting the drive shaft with the brake such that rotation of the drive shaft in a first direction forces the drive cone into engagement with a portion of the passage wall to rotate the housing in the first direction and rotation of the drive shaft in an opposite direction forces the brake into engagement with another part of the passage wall to brake rotation of the housing;

in the second position the clutch disconnecting the drive shaft from the brake such that the rotation of the drive shaft in the first direction forces the drive cone into engagement with the portion of the passage wall to rotate the housing in the first direction and rotation of the drive shaft in the opposite direction rotates the drive shaft in the opposite direction relative to the drive cone such that upon subsequent rotation of the drive shaft in the first direction, the drive cone is forced into engagement with the portion of the passage wall to rotate the housing in the first direction.

2. A coaster brake in accordance with claim 1, wherein the clutch includes a generally cylindrical coupling slidably mounted on the axle.

3. A coaster brake in accordance with claim 2, wherein the coupling includes a plurality of cogs for selective engagement with the drive cone and brake.

4. A coaster brake in accordance with claim 3, wherein the clutch includes an actuator rod longitudinally disposed through the axle, the rod being coupled to the coupling and adapted for slidable movement therewith.

5. A coaster brake in accordance with claim 4, wherein the rod is coupled to the coupling by a bearing member, the coupling including a circumferential groove engageable with the bearing member such that the coupling can rotate relative to the bearing member and the rod.

6. A coaster brake hub, comprising:

a housing including a generally cylindrical passage therethrough, the cylindrical passage including a longitudinal center axis and surrounding wall;

an axle rotatably mounted within the passage along the central axis;

a drive shaft rotatably mounted around the axle;

a drive cone disposed within the passage between the surrounding wall and the drive shaft;

a brake disposed within the passage between the surrounding wall and the axle; and a clutch disposed within the passage mounted to the axle, the clutch moveable between a first position and a second position, in the first position, the clutch rotatably interconnecting the drive shaft with the brake such that rotation of the drive shaft in a first direction forces the drive cone into engagement with a portion of the passage wall to rotate the housing in the first direction and rotation of the drive shaft in an opposite direction forces the brake into engagement with another part of the passage wall to brake rotation of the housing;

in the second position the clutch disconnecting the drive shaft from the brake such that the rotation of the drive shaft in the first direction forces the drive cone into engagement with the portion of the passage wall to rotate the housing in the first direction and rotation of the drive shaft in the opposite direction rotates the drive shaft in the opposite direction relative to the drive cone such that upon subsequent rotation of the drive shaft in the first direction, the drive cone is forced into engagement with the portion of the passage wall to rotate the housing in the first direction.

7. A coaster brake in accordance with claim 6, wherein the clutch includes a generally cylindrical coupling slidably mounted on the axle.

8. A coaster brake in accordance with claim 7, wherein the coupling includes a plurality of cogs for selective engagement with the drive cone and brake.

9. A coaster brake in accordance with claim 8, wherein the clutch includes an actuator rod longitudinally disposed through the axle, the rod being coupled to the coupling and adapted for slidable movement therewith.

10. A coaster brake in accordance with claim 9, wherein the rod is coupled to the coupling by a bearing member, the coupling including a circumferential groove engageable with the bearing member such that the coupling can rotate relative to the bearing member and the rod.

11. In a wheelchair including at least two wheels, two of the wheels each including a coaster brake hub including a housing having a generally cylindrical passage therethrough, the passage having a surrounding wall; the hub further including an axle, a drive shaft, a drive cone, and a brake mounted within the passage, wherein the improvement comprises:

a clutch disposed within the passage mounted to the axle, the clutch moveable between a first position and a second position, in the first position, the clutch rotatably interconnecting the drive shaft with the brake such that rotation of the drive shaft in a first direction forces the drive cone into engagement with a portion of the passage wall to rotate the housing in the first direction and rotation of the drive shaft in an opposite direction forces the brake into engagement with another part of the passage wall to brake rotation of the housing;

in the second position the clutch disconnecting the drive shaft from the brake such that the rotation of the drive shaft in the first direction forces the drive cone into engagement with the portion of the passage wall to rotate the housing in the first direction and rotation of the drive shaft in the opposite direction rotates the drive shaft in the opposite direction relative to the drive cone such that upon subsequent rotation of the drive shaft in the first direction, the drive cone is forced into engagement with the portion of the passage wall to rotate the housing in the first direction.

12. A wheelchair in accordance with claim 11, further comprising at least two levers, each lever having two ends, one end being connected to the drive shaft and the other end being adapted for holding by a person sitting in the chair, the levers being rotatable in the first direction to rotate the shaft in the first direction and rotatable in the second direction to rotate the drive shaft in the second direction.

13. A wheelchair in accordance with claim 12, wherein the clutch includes a coupling and an actuator rod, the actuator rod being longitudinally disposed through the axle, the rod being coupled to the coupling and adapted for slidable movement therewith.

14. A wheelchair in accordance with claim 13, wherein each lever includes an adaptor, the adaptor including an end being connected to the rod and the levers being pivotable generally transversely to their direction of rotation such that the rod and the coupling can be slidably moved between the first and second positions.

15. A wheelchair in accordance with claim 13, wherein the coupling is generally cylindrical.

16. A wheelchair in accordance with claim 15, wherein the coupling includes a plurality of cogs for selective engagement with the drive cone and brake.

17. A wheelchair in accordance with claim 13, wherein the rod is coupled to the coupling by a bearing member, the coupling including a circumferential groove engageable with the bearing member such that the coupling can rotate relative to the bearing member and the rod.

18. In wheelchair, wherein the improvement comprises:

a wheel hub including means for placing the hub in a mode for forward propulsion and braking of the hub, and a mode for forward propulsion and resetting the hub for further propulsion; and a lever having at least two ends, one end being connected to the hub and the other end being adapted for manipulation by a user to shift between the modes and propel, reset and brake the hub.

19. A wheelchair in accordance with claim 18, wherein the means for placing the hub in modes includes an actuator rod connected to the hub and a portion of the lever is operatively connected to the actuator rod.

20. A wheelchair wheel control apparatus comprising:

clutch means having a drive input and a drive output, said clutch means drive output operatively connected to said wheel, said clutch means having a forward propulsion mode and a brake mode, said clutch means driving said wheel while said clutch is in said forward propulsion mode and said drive input is rotating in a first direction, said clutch means not driving said wheel while said clutch means is in said forward propulsion mode and said drive input is rotating in a second direction, said clutch means braking said wheel while said clutch means is in said brake mode and said drive input is rotating in said second direction;

a lever operatively connected to said clutch means drive input;

means for switching said clutch between said forward propulsion and brake modes.

21. An apparatus a recited in claim 20, wherein said means for switching includes an adaptor operatively connected to said lever.

22. A method for propelling a wheelchair wheel comprising the steps:

providing a wheelchair chair wheel having a hub within, the hub having a clutch, and a lever having at least two ends, the hub being operatively connected to the wheel and having a mode for forward propulsion and braking and a mode for forward propulsion and freewheeling, the hub being operatively connected to forwardly propel and brake the wheel, the lever operatively connected at a first end to the hub and adapted to be pushed and pulled by a user at a second end, the lever operatively connected to the clutch to switch the hub between the modes;

pushing the lever away from the user in a forward direction substantially co-planar with the wheel, to propel the wheelchair in a forward direction;

pulling the lever toward the user in a direction opposite to the forward direction to position the lever for further forward propulsion;

pulling the lever toward the user in a direction substantially out of the plane of the wheel, to place the hub in a mode for braking; followed by pulling the lever toward the user, to brake the wheel rotation.

23. A method for controlling rotation of a wheelchair wheel comprising the steps:

provizing a clutch having a driveshaft input and a drive output, said clutch drive output operatively connected to said wheel, said clutch having a forward propulsion mode and a brake mode, said clutch driving said wheel while said clutch is in said forward propulsion mode and said driveshaft input is rotating in a forward direction, said clutch not driving said wheel while said clutch is in said forward propulsion mode and said driveshaft input is rotating in a backward direction, said clutch braking said wheel while said clutch is in said brake mode and said drive input is rotating in said backward direction;

providing a lever rotatably connected to said clutch driveshaft input;

providing a means for switching said clutch between said forward propulsion and brake modes;

pushing said lever in a forward direction, thereby propelling said wheel in said forward direction;

pulling said lever in a backward direction, thereby positioning said lever for a push in said forward direction;

switching said clutch to said brake mode;

pulling said lever in said backward direction, thereby braking said wheel.

24. A method as recited in claim 23, wherein said switching includes moving said lever in a direction substantially orthogonal to said forward and backward directions.

* * * * *